United States Patent [19]
Graham

[11] Patent Number: 5,404,995
[45] Date of Patent: Apr. 11, 1995

[54] VIBRATORY PARTS FEEDER

[76] Inventor: S. Neal Graham, 365 Beechwood Dr., Noblesville, Ind. 46060

[21] Appl. No.: 135,734

[22] Filed: Oct. 13, 1993

[51] Int. Cl.⁶ .............................................. B65G 27/02
[52] U.S. Cl. ...................................... 198/757; 198/759
[58] Field of Search ................ 198/752, 756, 757, 759

[56] References Cited

U.S. PATENT DOCUMENTS

| | | |
|---|---|---|
| 2,746,599 | 5/1956 | Weyandt . |
| 2,985,280 | 5/1961 | Burgess . |
| 3,011,625 | 12/1961 | Bailey et al. . |
| 3,127,001 | 3/1964 | Ferris . |
| 3,133,627 | 5/1964 | Lenders et al. . |
| 3,258,111 | 6/1966 | Spurlin et al. . |
| 3,322,260 | 5/1967 | Schwenzfeier . |
| 3,447,660 | 6/1969 | Winans . |
| 3,599,783 | 8/1971 | Burgess . |
| 3,658,172 | 4/1972 | Hacker . |
| 4,181,216 | 1/1980 | Cipu . |
| 5,042,643 | 8/1991 | Akama ............................ 198/757 X |

FOREIGN PATENT DOCUMENTS

| | | | |
|---|---|---|---|
| 0919159 | 2/1963 | United Kingdom ................ | 198/757 |
| 2134502 | 8/1984 | United Kingdom ................ | 198/757 |

Primary Examiner—James R. Bidwell
Attorney, Agent, or Firm—Woodard, Emhardt, Naughton, Moriarty & McNett

[57] ABSTRACT

A vibratory parts feeder includes a feeder bowl having a plurality of lugs affixed between the bottom wall and the cylindrical outside wall of the feeder bowl. Corresponding to each lug is a fastener that engages the lug through a corresponding opening in a top member, thereby securing the feeder bowl to the top member of the parts feeder. The top member is, in turn, supported by a plurality of drive springs connected between the top member and a base member. The drive springs attach to spring mounting pads incorporated within the top member that are radially outboard of the attached feeder bowl, A plurality of electromagnetic devices are mounted on the base member in cooperating relation with a corresponding plurality of ferrous striker plates attached to the top member for causing the rotation of the top member relative to the base member. The electromagnetic devices operate with the drive springs to induce both axial and rotational movement:, or oscillating motion of the top member, and thereby the feeder bowl, relative to the base member.

16 Claims, 6 Drawing Sheets

VIBRATORY PARTS FEEDER

BACKGROUND OF THE INVENTION

The present invention relates to the field of article feed mechanisms and sorters, and particularly to vibratory parts feeders having an attached vibratory feeder bowl.

Vibratory feeder bowls arid parts separators typically urge parts upwardly along a spiral path, by vibrating the spiral path both axially along and rotationally about its central axis. A vibratory drive unit is required to impart the necessary vibratory feed motion to the feeder bowl.

In the design of a vibratory parts feeder it has become an industry practice to attach the feeder bowl to a top member of the drive unit, wherein the top member and a stationary base member of the drive unit are connected by a plurality of drive springs. The attachment of the feeder bowl to the top member of the drive unit, and the attachment of the drive springs relative to the feeder bowl has been the subject of prior U.S. patents. For example, U.S. Pat. No. 4,181,216 to Cipu, U.S. Pat. No. 3,447,660 to Winaris, and U.S. Pat. No. 3,658,172 to Hacker disclose two methods of attaching the feeder bowl to the drive unit, and the mounting of the drive springs relative to the feeder bowl.

Designers of vibratory parts feeders have used several approaches to attach a feeder bowl to a drive unit. One approach, shown in FIG. 1, of attaching the feeder bowl (a) to the drive unit utilizes clamp nuts (b) that clamp a lower flange (e) of the cylindrical wall (c) of the feeder bowl (a) to the top member (d) of the drive unit. Another method, shown in FIG. 2, incorporates a plate welded (f) to the lower side of the bottom of the feeder bowl (h). The feeder bowl is secured to the top member (j) with bolts (i) that thread vertically into the plate. A third alternative, shown in FIG. 3, attaches the feeder bowl (k) to the drive unit with bolts (l), that pass horizontally through clearance holes in the lower flange (h) of the cylindrical wall (m) of the feeder bowl (k) and engage the outer periphery of the top member (o).

These three approaches to attach the feeder bowl to the drive unit have a common limitation. Specifically, these prior methods of attachment allow the sidewall and bottom of the feeder bowl to flex, thereby wasting a portion of the feed motion intended for transfer to the articles in the feeder bowl.

The relative mechanical advantage of the drive unit is dependent upon the location where the drive springs attach to the top member. The industry standard is to mount the drive springs to the top member inboard of the cylindrical wall of the feeder bowl. One device, shown in U.S. Pat. No. 4,181,216 to Cipu, includes mounting the drive springs to the top member outboard of the cylindrical wall of the feeder bowl. However, Cipu attaches the feeder bowl centrally to the top member so flexing is still a problem.

The combined method of attaching the feeder bowl to the top member of the drive unit, and time mounting of the drive springs to the top member relative to the feeder bowl impact the quantity of vibratory feed motion imparted to the articles in the feeder bowl.

There remains a need for an improved vibratory parts feeder that maximizes the mechanical advantage of the drive unit and minimizes the amount of vibratory feed motion washed by the flexing of the cylindrical wall and the bottom of the feeder bowl.

SUMMARY OF THE INVENTION

To address the unmet needs of prior systems, the invention contemplates a vibratory parts feeder which includes, generally, a base member, a feeder bowl, a top member adapted for mounting the feeder bowl thereon, means for vibrating the top member, and a plurality of drive springs connecting the hop member and the base member together. The means for vibrating the top member can include a means for biasing the top member in alternative first or second biases relative to the base member which is operable with the means for rotating the top member in alternative first or second directions of rotation relative to the base member. The system further includes the capability to change the driven direction of rotation of the means for rotating between the first direction of rotation and the second direction of rotation. This combination of rotational and axial motion vibrates the top member.

In one aspect of the invention, the drive springs are attached to the top member radially outboard of the feeder bowl. Attaching the drive springs outboard of the feeder bowl increases the mechanical advantage of the drive unit. The increased mechanical advantage enables a less powerful drive unit to vibrate the feeder bowl. Further, the drive springs support the top member approximately level above the base member and form part of the means for biasing the top member.

In another aspect of time invention, a plurality of lugs are affixed between the bottom and the cylindrical outside wall of the feeder bowl. Corresponding to each lug is a fastener that engages the lug, thereby securing the feeder bowl to the top member of the vibratory parts feeder.

It is an object of the present invention to provide an improved mounting of the feeder bowl to the top member of the vibratory parts feeder. This improved mounting increases the quantity of vibratory feed motion transferred to the articles in the feeder bowl, by decreasing the amount of energy wasted.

A further object of the present invention is to provide an increase in the vibratory feed motion imparted to the articles in the feeder bowl by increasing the mechanical advantage of the system.

Further objects and advantages of the present invention will be apparent from the description which follows.

DESCRIPTION OF THE PREFERRED EMBODIMENT

Figure 1:
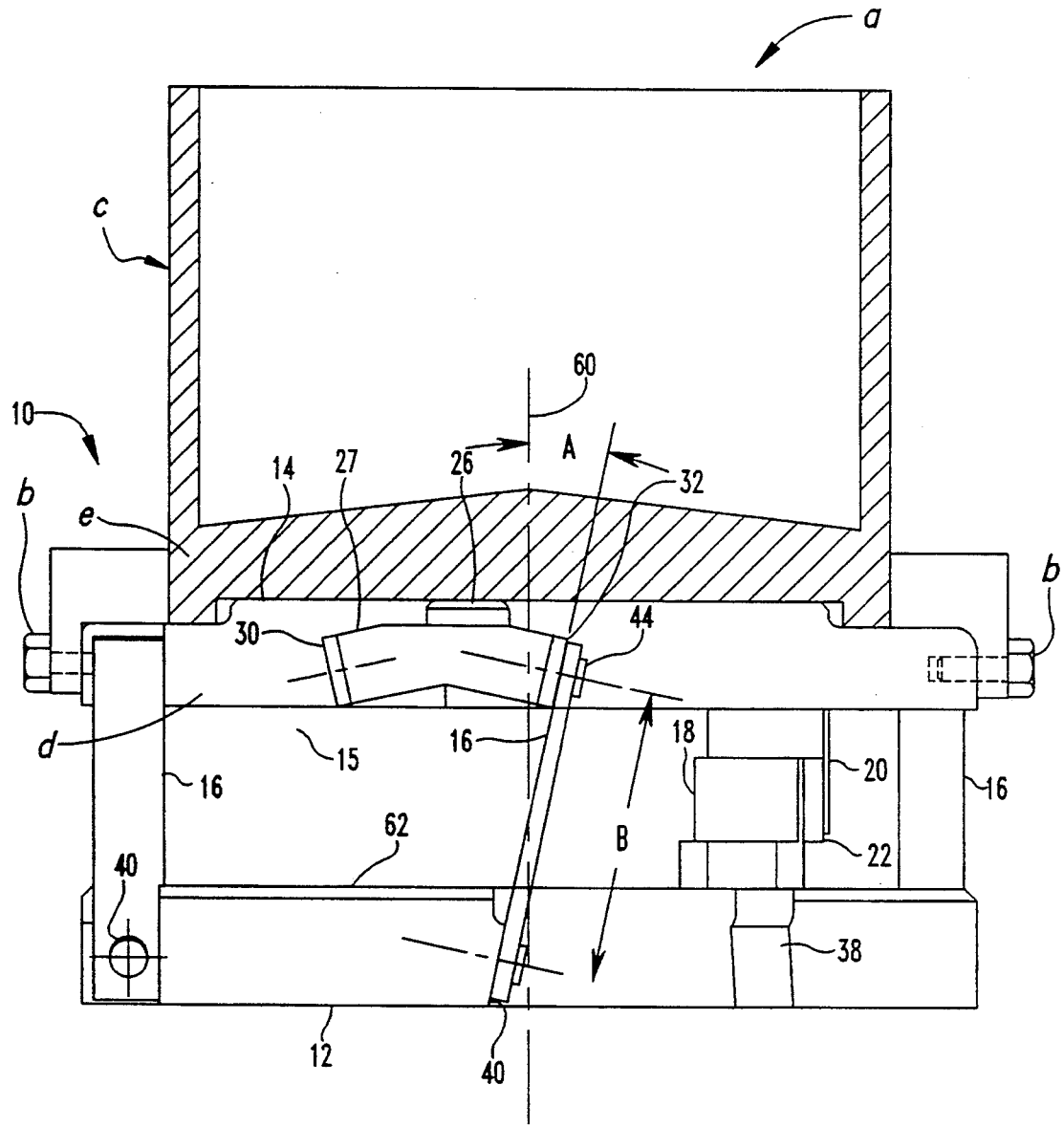
FIG. 1 is a perspective view of a prior method to attach the feeder bowl to the top member with clamp nuts.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated wherein being contemplated as would normally occur to one skilled in the art to which the invention relates.

Figure 4:
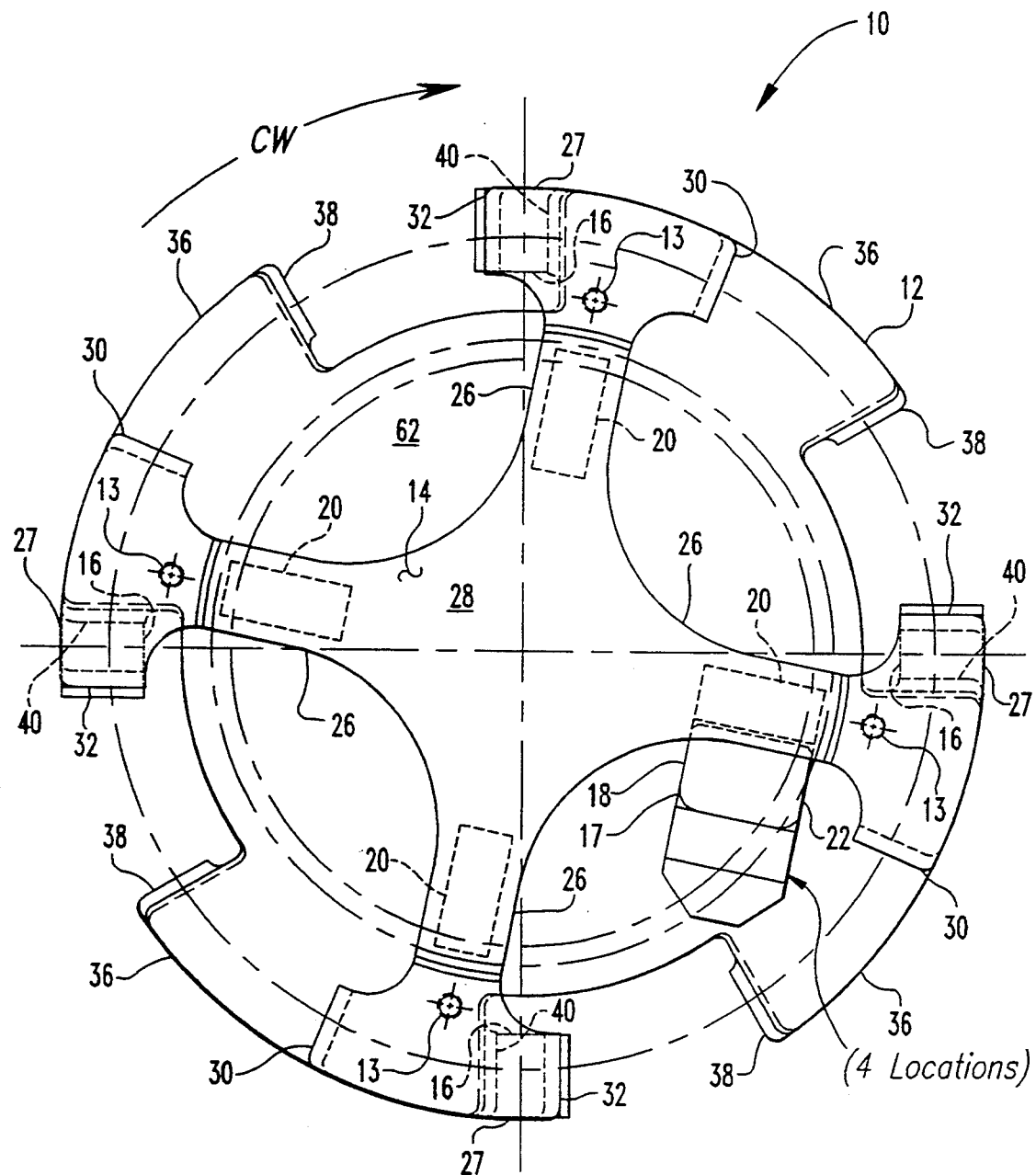
FIG. 4 is a top plan view of the vibratory parts feeder according to one embodiment of the present invention with the feeder bowl removed.
Figure 5:
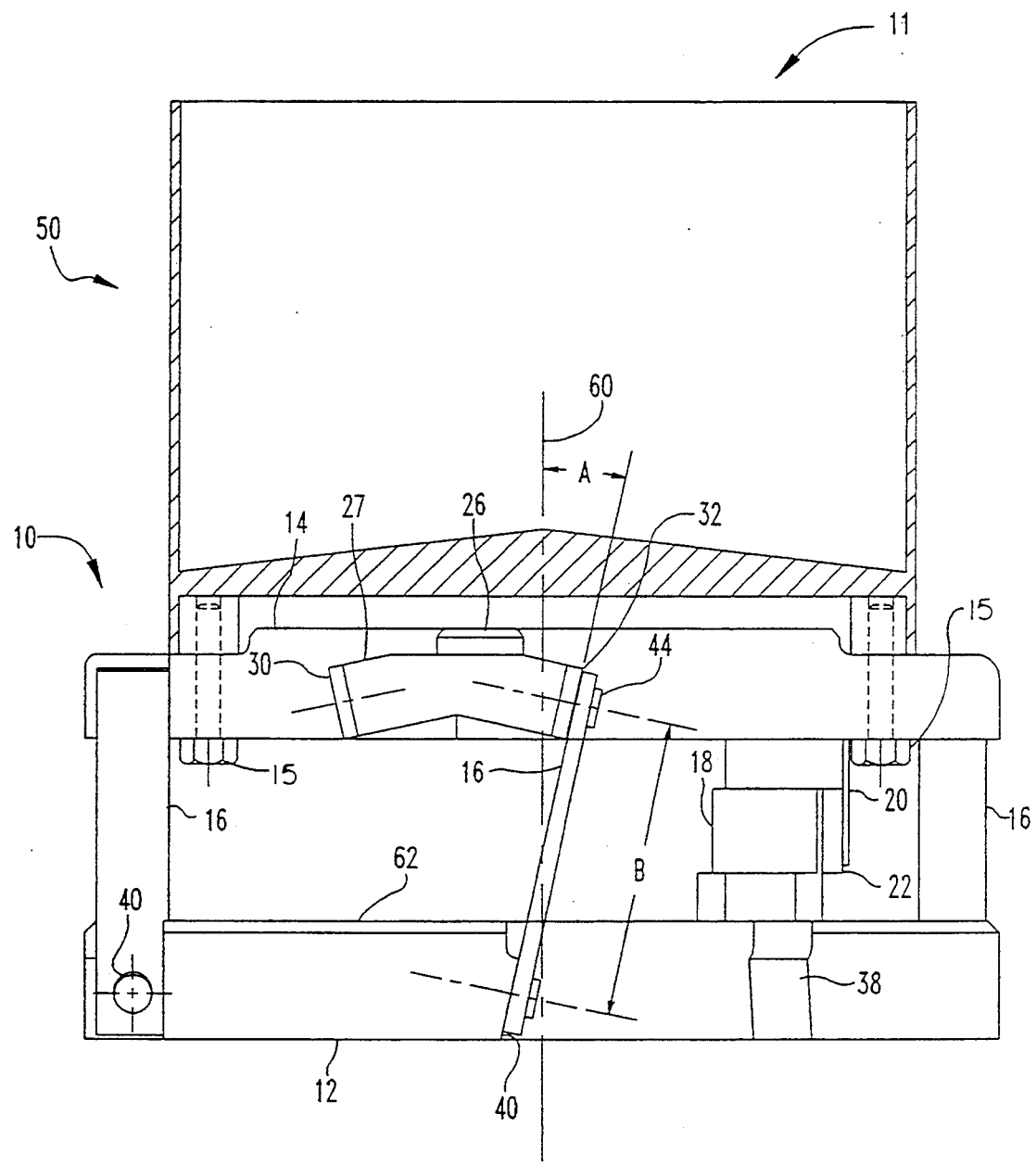
FIG. 5 is a side elevational view of the vibratory parts feeder in FIG. 1 with the feeder bowl attached.
Figure 6:
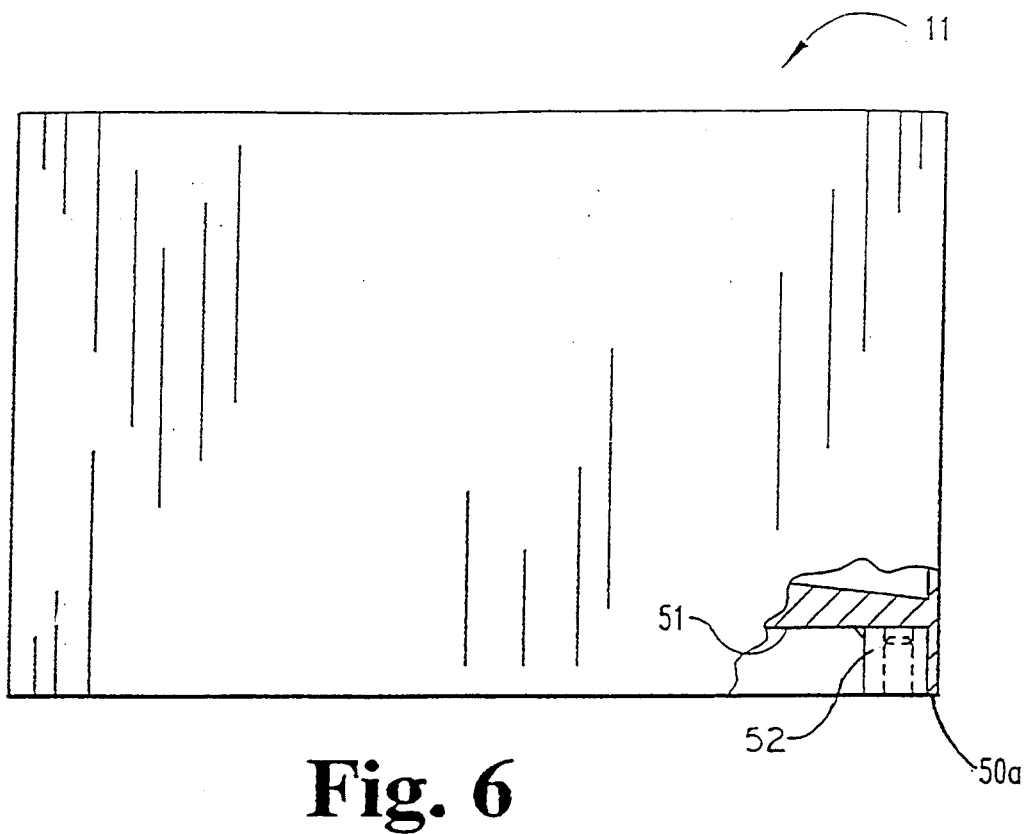
FIG. 6 is a side view of the feeder bowl shown in FIG. 5.

Referring now to FIGS. 4 and 5, a vibratory parts feeder 10 in accordance, with the present invention is shown which includes a base member 12 and a top member 14. A plurality of drive springs 16 are connected between top member 14 and base member 12. The drive springs provide means for supporting top member 14 approximately level above base member 12 and form part of the means for biasing top member 14 relative to base member 12.

Means 17 for rotating the top member 14 relative to base member 12 is provided, which preferably includes a plurality of electromagnetic devices 18 operable with a corresponding plurality of ferrous striker plates 20. Electromagnetic devices 18 operate in a conventional manner by providing an electromagnetic field when electric coils 22 are energized to attract striker plates 20 toward coils 22, thereby rotating the top member 14 in a clockwise direction relative to base member 12. This movement operates against the combined spring force provided by drive springs 16. Because drive springs 16 are mounted at an angle against the driven direction of rotation, the clockwise rotation causes the drive spring to also move top member 14 vertically upward to base member 12. When electrical coils 22 are de-energized, the drive springs 16 retract to their rest position and pull the top member 14 vertically down and rotate top member 14 in a counterclockwise direction to return it to its initial position. By cycling the electrical coils 22 between energized and de-energized states, the electromagnetic devices 18 cooperate with the drive springs 16 to induce both axial and rotational vibratory or oscillating motion of top member 14 relative to base member 12.

Turning now to the drive components of vibratory parts feeder 10 in greater detail, top member 14 includes, in the preferred embodiment, four cross arms or spokes 26 corresponding to the number of drive springs 16. Top member 14 includes a hole 13 therethrough at the radial end 27 of each spoke 26 for attaching a feeder bowl 11 thereon. The location of the holes 13 in the top member correspond to the lugs 52 affixed to the bottom of the feeder bowl 11. Each spoke 26 further includes the striker plate 20 mounted to its underneath side and disposed adjacent to a corresponding electromagnetic device 18.

The mechanical advantage of the drive unit is improved with the present invention by the location at which the drive springs attach to the top member. As depicted in FIG. 4, the spokes 26 of top member 14 have alternative first and second tipper drive springs mounting pads 30 and 32, to which the drive springs can alternatively mount depending on whether a clockwise or counterclockwise driven direction of top member 14 is desired. The spring mounting pads 30 and 32 are located radially outboard of the attached vibratory feeder bowl 11.

The mounting of the drive springs outboard of the feeder bowl increases the power of the unit dramatically. This increase in power allows the opportunity to drive the unit with smaller electromagnetic coils and weaker drive springs.

In one specific embodiment, top member 14, which is constructed of ductile iron, is machined to form the spring mounting pads 30 and 32 thereon. The spring mounting pads 30 and 32 are circumferentially spaced from hole 13 which greatly increases the accessibility to threaded fastener 15. The increased accessibility to threaded fastener 15 enhances the service technician's ability to maneuver a tool, such as an open end wrench, for the screwing or unscrewing of fastener 15. The spring mounting pads are machined at a 12° angle relative to centerline 60 and include a tapped hole for attaching the drive springs thereto. Base member 12 similarly includes cross arms or spokes 36 having first and second lower spring mounting pads 38 and 40 corresponding to spring mounting pads 30 and 32 of top member 14, respectively. As shown in FIGS. 4 and 5, the drive springs 16 attach at an angle between corresponding lower and upper spring mounting pads, such as between pads 32 and 40, to bias the top member 14 both axially and rotationally relative to base member 12. To change the bias of the top member 14, drive springs 16 are attached between upper spring mounts 30 and lower spring mounting pad 38.

In addition to providing alternative mounting locations for drive springs 16, base member 12 further includes alternative mounting locations for electromagnetic device 18 corresponding to clockwise and counterclockwise driven directions of rotation. Therefore simply by changing the attachment position of drive springs 16 and electromagnetic devices 18, the driven direction of rotation of top member 14 can be changed between clockwise and counterclockwise direction.

Figure 7:
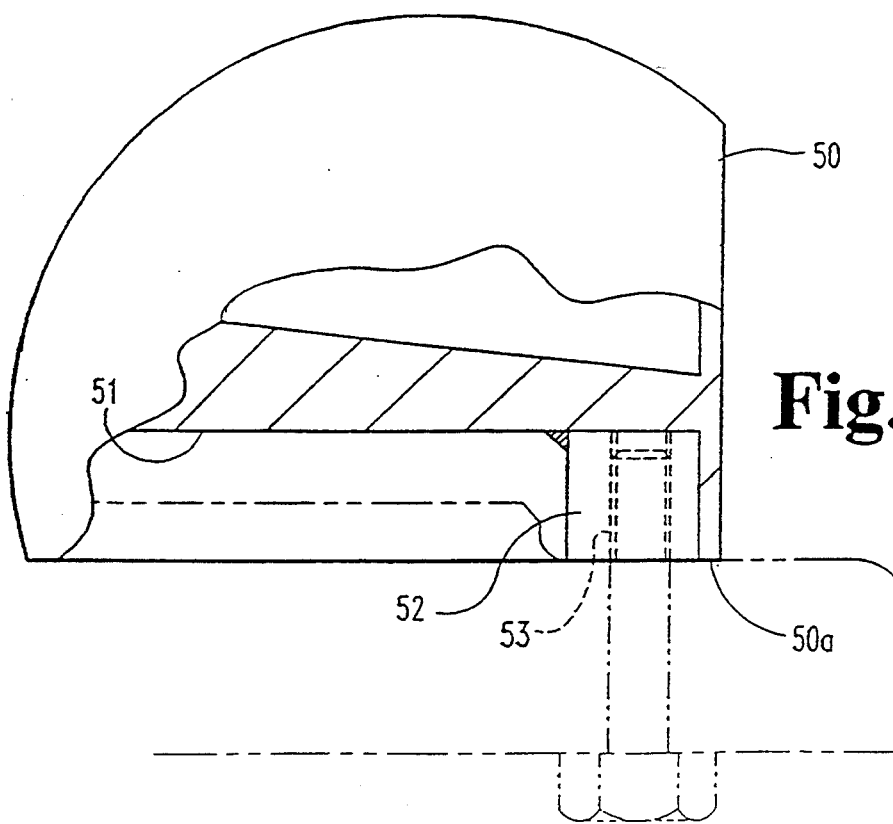
FIG. 7 is an enlarged view of the lug shown in FIG. 6.

Turning now to the individual components of the feeder bowl 11 in greater detail, feeder bowl 11 includes a cylindrical outer wall 50 connected to the circumference of the bottom wall 51 of feeder bowl 11. The outer wall 50 extends below the bottom wall 51 to form a flange portion 50a. In one feature of the invention, as shown in FIG. 7, a lug 52 is welded between the bottom wall 51 and the flange portion 50a of the outer wall 50. In the preferred embodiment, four (4) such lugs 52 are affixed at 90° intervals circumferentially around the feeder bowl. Corresponding clearance holes 13 are defined in the radial end 27 of each spoke 26 of top member 14 aligned with each lug 52.

In one embodiment, each lug 52 includes a threaded bore 53 opening toward a corresponding clearance hole 13 in the top member 14. Externally threaded fasteners 15 pass through the clearance holes 13 to engage the threaded bore 53 of lugs 52, thereby attaching the feeder bowl 11 to the top member 14.

Figure 2:
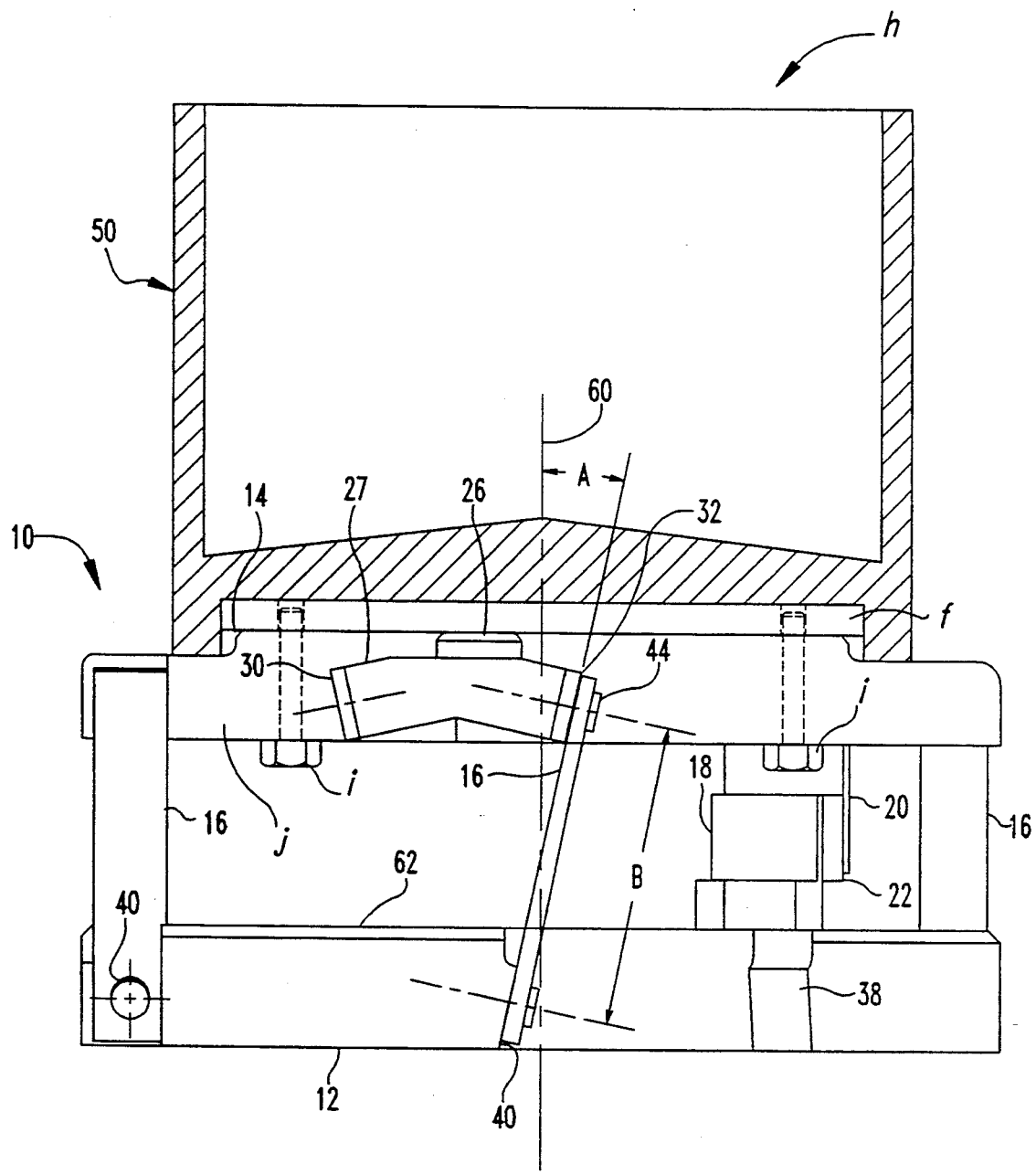
FIG. 2 is a perspective view of a prior method to attach the feeder bowl, which incorporates a plate welded to the bottom of the feeder bowl, to the top member with bolts that thread into the plate.
Figure 3:
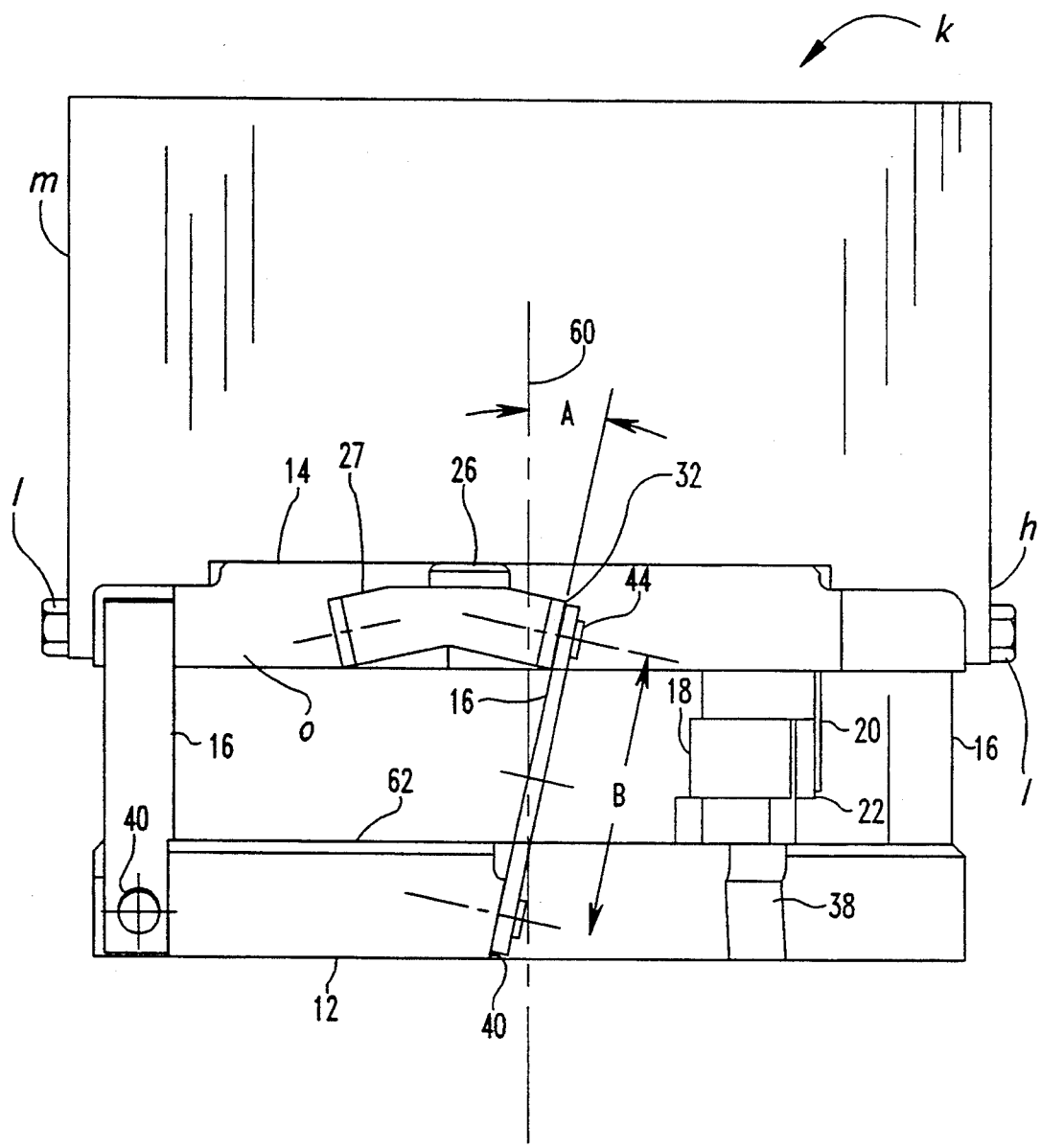
FIG. 3 is a perspective view of a prior method to attach the feeder bowl to the top member with bolts that horizontally engage the outer periphery of the top member.

The attachment of the feeder bowl to the top member in the preferred embodiment increases the vibratory feed motion transferred from the drive unit to the feeder bowl. The preferred embodiment directly attaches both the circumferential wall 50, inherently the most rigid structural part of the feeder bowl, and the bottom wall 51 to the top member. The prior methods did not attach both walls directly to the top member, thereby allowing a portion of the feed motion to be wasted by the flexing of the feeder bowl. For example, the prior arrangements in FIGS. 1 and 2 are susceptible to flexing of the circumferential side wall, while the construction of FIG. 3 loses transmission power through the flexing of the bottom wall. The present invention eliminates both sources of vibratory power loss.

Other means for mounting the feeder bowl to the top member are contemplated besides use of a lug welded to the bottom of the feeder bowl and a corresponding fastener. For example, the feeder bowl could be attached to the top member by utilizing an externally threaded stud, welded between the bottom and the cylindrical outer wall of the feeder bowl, which extends through the clearance holes in the top member. A nut with a threaded bore engages the stud, securing the feeder bowl to the top member.

In addition, other means for rotating the top member relative to the base member are contemplated besides electromagnetic means, including but not limited to a mechanical bidirectional drive motor centrally mounted on base member 12 and having an output shaft directed vertically upward and connected to top member 14. The bidirectional drive motor can be either conventionally electric of fluid powered with transmission means for switching between directions of driven rotation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vibratory parts feeder, comprising:
   a feeder bowl including a bottom wall and a cylindrical outside wall connected to said bottom wall;
   a top member for mounting said feeder bowl thereon;
   a plurality of lugs affixed to said feeder bowl, said plurality of lugs connected between said bottom wall and said cylindrical outside wall of said feeder bowl;
   a fastener engaged between said lugs and said top member; and
   means for vibrating said top member.

2. The vibratory feeder of claim 1, wherein said feeder bowl defines a flange wall portion on said cylindrical outside wall and said flange wall portion extends below said bottom wall.

3. The vibratory feeder of claim 1, wherein, said fastener is externally threaded.

4. The vibratory feeder of claim 1, wherein: each of said plurality of lugs define a threaded bore for receiving said fastener; and
   said top member having a plurality of holes.

5. The vibratory feeder of claim 1, wherein said means for vibrating includes:
   a base member; and
   a plurality of drive springs connected between said top member and said base member.

6. The vibratory feeder of claim 5, wherein said feeder bowl includes a flange wall portion on said cylindrical outside wall and said flange wall portion extends below said bottom wall.

7. The vibratory feeder of claim 6, wherein, said fastener is externally threaded.

8. The vibratory feeder of claim 7, wherein: each of said plurality of lugs define a threaded bore for receiving said fastener; and
   said top member having a plurality of holes.

9. A vibratory parts feeder, comprising:
   a base member;
   a top member;
   a feeder bowl, including a bottom wall having a circumferential edge and a cylindrical outside wall connected to said bottom wall, wherein said feeder bowl is affixed to said top member;
   a plurality of lugs affixed between said bottom wall and said cylindrical outside wall of said feeder bowl;
   a fastener engaged between said lugs and said top member;
   a plurality of drive springs connected between said top member arid said base member, wherein said drive springs attached to said top member at locations radially outboard from the circumferential edge of said bottom wall of said feeder bowl;
   means for vibrating said top member relative to said base member.

10. The vibratory feeder of claim 9, wherein said feeder bowl defines a flange wall portion on said cylindrical outside wall and said flange wall portion extends below said bottom wall.

11. The vibratory feeder of claim 9, wherein, said fastener is externally threaded.

12. The vibratory feeder of claim 9, wherein: each of said plurality of lugs define a threaded bore for receiving said fastener; and
    said top member having a plurality of holes.

13. The vibratory feeder of claim 9, additionally comprising:
    a plurality of spring mounts, incorporated in said top member; and
    wherein said top member has four spokes, said spokes have a radial end that include said spring mount; and wherein said spring mounts connect said top member to said drive springs.

14. The vibratory feeder of claim 13, wherein said feeder bowl defines a flange wall portion on said cylindrical outside wall and said flange wall portion extends below said bottom wall.

15. The vibratory feeder of claim 14, wherein, said fastener is externally threaded.

16. The vibratory feeder of claim 15, wherein: each of said plurality of lugs define a threaded bore for receiving said fastener; and
    said top member having a plurality of holes.

* * * * *